Oct. 18, 1966  J. H. ALBERS  3,279,315
PRISMOIDAL REAR VIEW MIRROR HAVING ACTUATING ROCK CAM
Filed Dec. 27, 1961  2 Sheets-Sheet 1
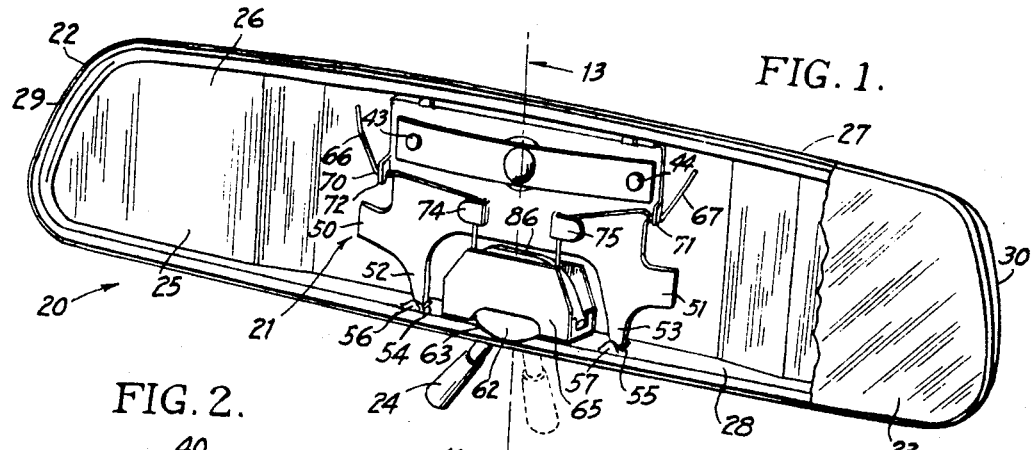
FIG. 1.
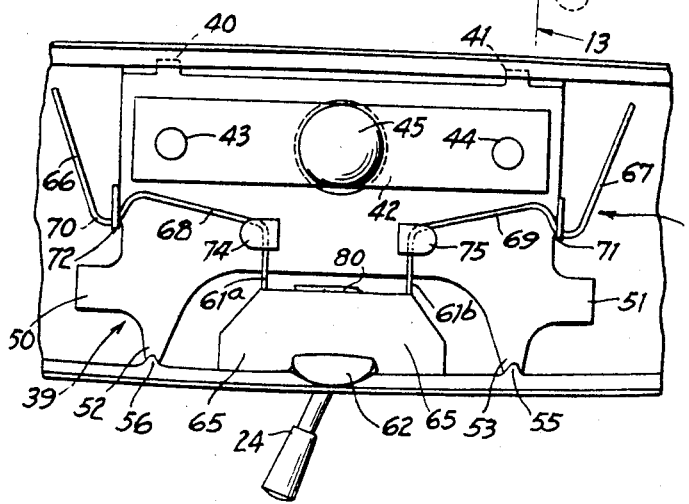
FIG. 2.
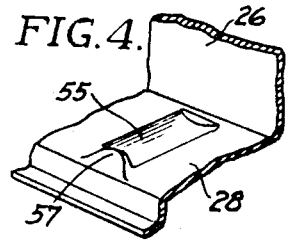
FIG. 4.
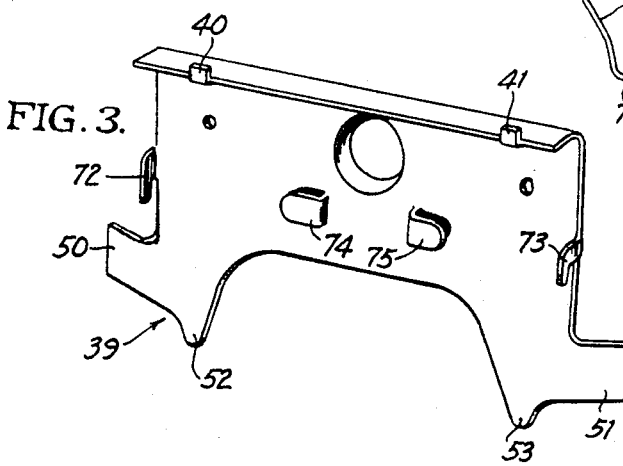
FIG. 3.
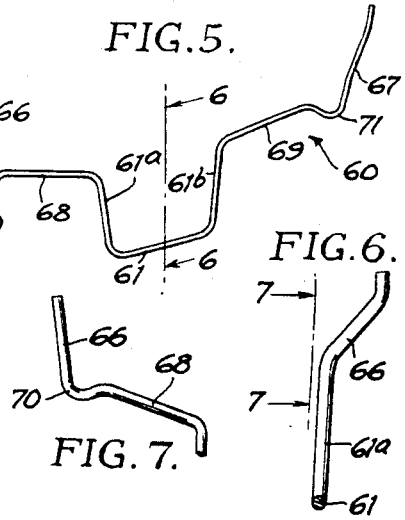
FIG. 5.
FIG. 6.
FIG. 7.
INVENTOR.
JOSEPH H. ALBERS
BY
Pearce and Schaeper Klaus
ATTORNEYS Oct. 18, 1966     J. H. ALBERS     3,279,315
PRISMOIDAL REAR VIEW MIRROR HAVING ACTUATING ROCK CAM
Filed Dec. 27, 1961     2 Sheets-Sheet 2
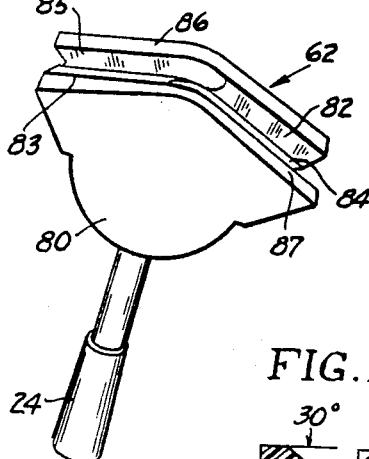
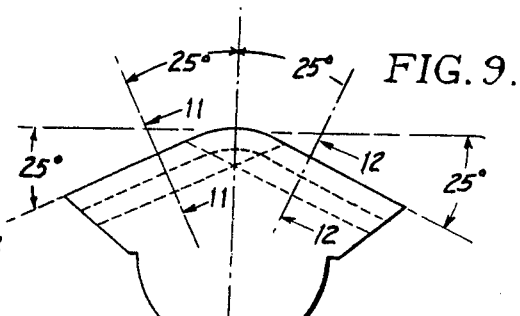
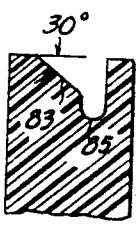
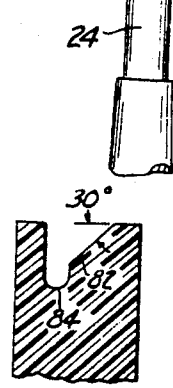
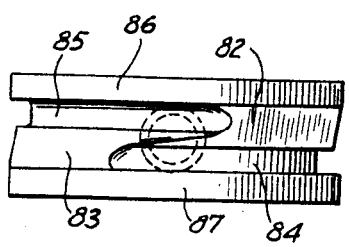
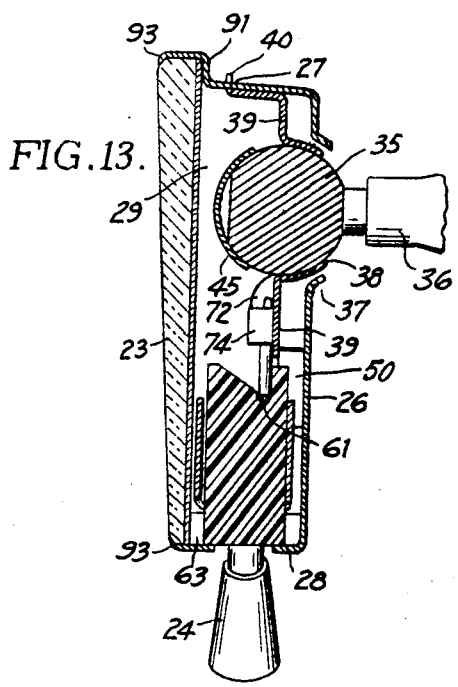
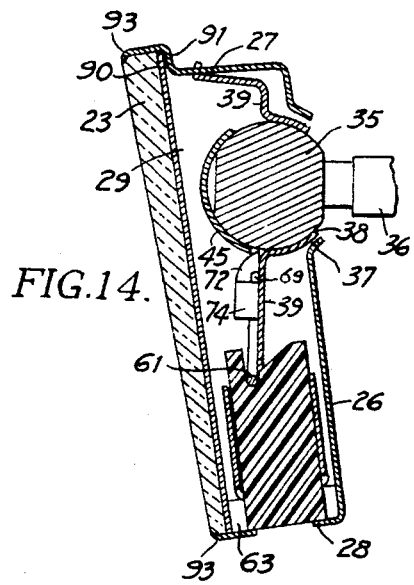
INVENTOR.
JOSEPH H. ALBERS
BY
Pearce and Schaeperklaus
ATTORNEYS

United States Patent Office 3,279,315
Patented Oct. 18, 1966

3,279,315
PRISMOIDAL REAR VIEW MIRROR HAVING
ACTUATING ROCK CAM
Joseph H. Albers, Kemper and Reading Roads,
Wyoming, Ohio
Filed Dec. 27, 1961, Ser. No. 162,416
7 Claims. (Cl. 88—77)

This invention relates generally to rear view mirrors adapted for use in vehicles or the like, and which include a prismoidal reflecting mirror or panel from which a high intensity reflection position and a low intensity reflection position may be obtained by merely tilting the panel from the one position to the other. In particular, this invention relates to a mechanism which efficiently and effectively achieves a positive tilting or pivoting action.

One hazard in driving an automobile upon roads at night is the glare from headlights of cars behind that of the driver, which glare is often and at times unexpectedly reflected into the eyes of the driver by the rear view mirror conventionally mounted interiorly of the car adjacent the upper or lower edge of the windshield. A single mirror has been developed having both a high intensity reflection for day time driving, and a low intensity reflection for night time driving. Such low intensity reflection substantially reduces headlight glare from following cars thereby decreasing the hazard of the blinding effect of the glare and correspondingly increasing the safety and ease with which the vehicle may be handled. The intensity of the reflection reflected by the rear view mirror to the eye of the driver is dependent upon the position of and the angle at which the light from the headlights of following cars strike the mirror.

An object of this invention, therefore, is to provide for a dual intensity rear view mirror which can be conveniently and easily actuated to either one of the two reflecting positions.

Another object of this invention is to provide for a positive locking of the mirror in either of the two reflecting positions corresponding to the relation of the position of the driver's eyes and area to be viewed.

A further object of this invention is to provide for an efficient and uncomplicated mirror positioning or tilting mechanism, the actuation of which positions the mirror in either of the two reflecting positions without disturbing the aim of the mirror, that is, without altering the field of view area observable in the mirror by the driver using it.

Another object of this invention is to provide a device of the above character in which the mirror positioning or tilting mechanism locks, so that aiming of the mirror, to render viewable therein the desired field of view from the driver's desired viewing position, does not actuate the mirror positioning mechanism and alter the intensity of the reflected image.

A further object of this invention is to provide for a construction of a rear view mirror in which the entire depth of the device is of lesser dimensions than those heretofore manufactured, thereby lending itself to cobpactness in appearance.

These and other objects will be apparent to those skilled in the art to which the subject matter of this invention pertains, and is more fully disclosed by a reading of the following description and the appended claims thereto, and with which the accompanying drawings are taken in conjunction, in which drawings:

FIG. 1 is a view in perspective of a rear view mirror embodying this invention, portions thereof being broken away to show details of construction;

FIG. 2 is a fragmentary view in elevation of a mirror casing and mechanism housed therein with gasket board and mirror removed;

FIG. 3 is a view in perspective of a chassis which is part of the mechanism housed in the mirror casing;

FIG. 4 is a fragmentary view in perspective of the casing shown in FIGS. 1 and 2;

FIG. 5 is a view in perspective of a spring which is part of the mechanism housed in the mirror casing;

FIG. 6 is a fragmentary view in section taken on line 6—6 of FIG. 5.

FIG. 7 is a fragmentary view in section taken on line 7—7 of FIG. 6;

FIG. 8 is a view in perspective of a rock cam and lever;

FIG. 9 is a view in elevation of a rock cam and lever;

FIG. 10 is a top plan view of the rock cam;

FIG. 11 is a view in section taken on line 11—11 of FIG. 9;

FIG. 12 is a view in section taken on line 12—12 of FIG. 9;

FIG. 13 is a view in section taken on line 13—13 of FIG. 1 with the rock or finger lever in the limit position shown in full lines in FIG. 1; and FIG. 14 is a view in section taken on line 13—13 of FIG. 1, but with the rock lever swung to the limit position shown in dash lines in FIG. 1.

In the drawings, character 20 refers to a rear view mirror for an automobile. The rear view mirror 20 comprises an assembled mechanism 21 centrally mounted in and in cooperative relation to a shell or housing 22 which supportingly engages the peripheral portion of a prismoidal mirror or reflective panel 23. The assembly 21 is in cooperative engagement with a support arm mounted on the car and is actuatable by manipulation of finger piece or lever 24, projecting out of the lower edge of housing 22, to tilt or pivot reflective panel 23 and housing 22 in unison to position the reflecting panel in either a high intensity reflection or lower intensity reflection position with respect to the operator or driver of the vehicle.

Housing 22 comprises a stamped metal shell case or the like having a back 26 from which a forwardly projecting peripheral flange having a top portion 27, a base portion 28, and ends 29, 30, extends to annularly bound an open front 25 closed by reflective panel 23.

The assembled actuating mechanism 21 is mounted in housing 22 (FIGS. 1, 13, 14) upon a ball 35 formed integrally on a stem or tang 36 which is suitably rigidly coupled to an automobile in a conventional way. Enlarged ball 35 projects inwardly of a centrally disposed flared opening 37 in rear side 26 of housing 22 and also extends through a flared socket-like aperture 38 in chassis 39 pivotally supporting housing 22 by means of a pair of integral spaced upright tabs 40, 41 (FIGS. 2, 3) which extend into respective punctures in top portion 27. Chassis 39 is secured in snug frictional engagement with ball 35 by metal tension or clamping plate 42 which also engages ball 35 and horizontally extends across and is secured adjacent its ends by rivets 43, 44 to chassis 39 (FIG. 2). A socket saddle 45 is centrally provided in plate 42 which cradles and frictionally holds ball 35 in fixed relation therein except during adjustment of the mirror position incident to re-aiming.

Housing 22 is relatively pivotable about chassis 39 by means of tabs 40, 41 mounted thereto. As it will be hereinafter more fully described and evident, chassis 39 is locked in a positive manner in one of two limit positions between which it is capable of being relatively pivotable about housing 22. Situated in or mounted substantially the lower section of chassis 39 (FIG. 3) are a pair of fingers or means 50, 51 projecting outwardly from its sides, each curving rearwardly towards rear side 26 (FIGS. 1, 3) so that in movement of chassis 39 towards its rearward limit position, fingers 50, 51 engage rear side 26 thereby limiting further movement of chassis 39. A pair of spaced legs 52, 53 depend from chassis 39, into respective grooves or tracks 54, 55 (FIGS. 1, 4) provided in base portion 28 between rear side 26 and open side 25. Grooves or tracks 54, 55 respectively terminate short of open side 25 at the stop members or abutments 56, 57. Pivotal movement of chassis 39 to its forward limit position is limited by the movement of legs 52, 53 in groove or tracks 54, 55, respectively, into indexing engagement with respective abutments 56, 57. The cooperation of legs 52, 53 with base portion 28 in their respective tracks 54, 55 also limits shifting movement of chassis 39 between top portion 27 and bottom portion 28 in housing 22 which would otherwise occur because of the freedom of vertical movement of tabs 40, 41 in top portion 27. The fragmentary view shown in FIG. 4 clearly discloses the kind of track and abutment that is preferred in the instant embodiment, illustrated with respect to track 55 and abutment 57. These features are preferably formed in base portion 28 of metal housing 22 upon forming of same.

Means are provided by which a positive locking of the chassis assures proper placement of panel 23 in either of its two reflecting positions as desired. Cooperating with chassis 39 is a preformed wire spring 60 (detailed in FIGS. 5, 6, and 7). Spring 60 has a depending portion 61 in cooperation with a rock cam 62 resting in a depression 63 of base portion 28, so that upon angular movement or rotation of cam 62, depending portion 61 reciprocates between one of two grooves in rock cam 62. The action of such reciprocation is transmitted to the remainder of wire spring 60 which is cooperatively coupled to chassis 39 thereby actuating or reciprocating the chassis in a corresponding manner. The forces imposed on cam 62 by depending portion 61 during reciprocation of chassis 39 tend to rock the cam 62 out of its proper rotating plane and thereby apply undue pressure against panel 23. Rock cam 62 is therefore preferably stabilized for rotation in a single plane by means of cam box or well 65 secured to base portion 28 of housing 22 by suitable means such as welds, rivets or the like (not shown). It is obvious that a force of reaction between cam 62 and spring 60 tends to maintain cam 62 in its depression in base portion 28.

Wire spring or cam stop 60 is formed from a unitary strip of flexible spring wire, and comprises rectangularly-arranged depending portion or cam-engaging head 61, arms 68, 69 respectively mounted on each side thereof, and end portions 66, 67 respectively coupled to arms 68, 69 by means of arcs 70, 71, respectively. End portions 66, 67 are bent towards and engage rear side 26 while arcs 70, 71 respectively cooperatively engage integral ears or hooks 72, 73, formed substantially midway along each side edge of chassis 39. A pair of spaced lugs 74, 75 are stamped out of chassis 39 to cooperatively engage the juncture of the depending arms 61a, 61b respectively, of depending portion 61 and arms 68, 69. In this manner, chassis 39 swings between its two limit positions as spring 60 is cammed from its one cooperatively engaging position with cam 62 to its other such position with cam 62.

Rock cam 62 (FIGS. 8, 9, 10, 11 and 12) may be fabricated from any suitable material and comprises a cam portion and a lever or arm 24. Finger piece or lever 24 extends radially from circularly-shaped hub 80 and may be an integral portion thereof or a separate piece fused, wedged, or in other fashion, secured thereto. Hub 80 is angularly-rotatable about its central axis by lever 24 projecting through an opening provided in that portion in base portion 28 which defines depression 63 in housing 22. Cam 62 is maintained in such depression by the cooperative compressive action of depending portion 61 of wire 60 upon the cam surfaces, comprising areas 82, 83 and defining recesses 84, 85. Each recess 84, 85 is located contiguous to and below the foot or base depth of respective cam surfaces 82 or 83. The cam surfaces are offset with respect to each other and they and their corresponding recesses 84, 85 are generally formed on the side of hub 80 opposite lever 24 and in congruous relation to the center line of lever 24 extended. It is apparent from FIGS. 8, 9 that each half of rock cam 62, the halves lying on opposite sides of a plane which includes the axis of pivoting of cam 62 and the radius thereof which is the longitudinal center line of the lever 24, is congruous to the other, however, in the fabrication of cam 62, its cam surfaces and recesses are, of course, incorporated in the cam in reversed positions in their respective halves.

Each of a portion of the planes which extend transversely of and perpendicular to the respective recess 84 or 85, as the case may be with either recess, forms an angle of 25° with the plane of symmetry of cam 62, as illustrated in FIG. 9. Cam surfaces 82, 83 are inclined at an angle, preferably 30° (FIGS. 11 and 12), in their respective halves of rock cam 62, from overall surfaces 86, 87 (FIG. 8), respectively, lying in planes that are normal to the axial planes of each half respectively coincident to the section planes denoted by section lines 11—11 and 12—12 in FIG. 9. It has been determined that these angles are efficient and are the preferred arrangement of cam surfaces and recesses in cam 62 for the best operable relationship with depending portion 61 of spring 60 and by which a positive locking action of spring 60 with cam 62 occurs in either of the two limit positions for chassis 39. Depending portion 61 drops into either, as the case may be, recess 84 or 85 to lock housing 22 and panel 23 in fore or aft limit positions of swinging movement effected by swinging of lever 24 attached to rock cam 62 from one angular limit position to another. Thus, as seen in FIGS. 13, 14, chassis 39 is frictionally secured in some desired fixed relation on ball 35 of stem 36, and housing 22 and prismoidal mirror 23 pivot relative thereto, as cam 62 is rocked from the limit position shown in FIG. 13, in which lever 24 extends downwardly and away from the viewer, to the limit position shown in FIG. 14, in which lever 24 extends downwardly and toward the viewer, to raise depending portion 61 from recess 85 onto cam surface 82 down which it resiliently slides into recess 84 below cam surface 82 (FIG. 14). Portion 61 thus resiliently cooperates with the surface defining the bottom of groove-like recess 84, to positively rotate cam 62 into the limit position in which portion 61 rests in and in longitudinal alignment with groove-like recess 84 to lock housing 22 and mirror 23 in corresponding position. In the opposite movement of lever 24 portion 61 is lifted from recess 84 onto surface 83 down which it slides into recess 85 to similarly act upon cam 62.

FIG. 14 is somewhat exaggerated to show the pivotal relationship between housing 22 and assembly 21 as same move with reference to chassis 39 from one limit position to the other. In actual operation of the device, stem 36 and ball 35 remain rigid with respect to the automobile frame to which it is mounted. As finger lever 24 is actuated from its left position (FIGS. 1, 13) to its right position (FIG. 14, and in dashed lines in FIG. 1), housing 22 and panel 23 are tilted downwardly or counter-clockwise from a position corresponding to that shown in FIG. 13 to one corresponding to that shown in FIG. 14, about the axis determined by cooperation of portion 27 with tabs 40 and 41 extending through apertures therein. However, chassis 39 and its sub-components remain in the same position relative to ball 35 and stem 36 as shown in FIG. 13, when lever 24 is swung from its one limit position to the other to alter the reflection intensity position of panel 23. Since metal-clamping plate 42 is held snugly and frictionally to ball 35 and is riveted to chassis 39, spring 60 will cause angularly-rotating rock cam 62 to move in accordance with depending portion 61's substantially stationary position. And since well in which rock cam 62 is stabilized, is secured to base portion 28 of housing 22, the desired resultant effect is that housing 22 pivots relatively to stem 36 thereby changing the angle of reflection of panel 23 and its reflection intensity to the driver of the vehicle.

To re-aim the mirror while it is in one of its two reflecting positions, housing 22 and chassis 39 are pivoted about ball 35, without the disadvantage of tilting the mirror into its other reflecting position, which is such a common experience in other mirrors. This unique advantage is provided by the cooperative locking engagement of spring 60 with each recess 84, 85, so that in effect housing 22 is positively locked in one reflecting position until rock cam 62 is actuated.

It should be noted that a cardboard gasket 90 or the like is provided directly behind panel 23 and between it and flange 91 of casing 22, substantially reducing the noise attendant to the snapping action of depending portion 61 into one or the other of grooves 84, 85. Both panel 23 and gasket 90 are supported in their mounting to housing 22 by forming of peripheral rim portion 93 of housing 22 about the exteriorly tapered edges of panel 23, as shown in FIGS. 13, 14.

Pursuant to the requirements of the patent statutes, the principle of this invention has been explained and exemplified in a manner so that it can be readily practiced by those skilled in the art to which it pertains, such exemplification including what is presently considered to represent the best embodiment of the invention. However, it should be clearly understood that, within the scope of the appended claims, the invention may be practiced otherwise than as specifically described and exemplified herein, by those skilled in the art, and having the benefit of this disclosure.

That which is claimed as patentably novel is:

1. In a mirror having a high and low intensity reflection panel, a housing supporting the reflective panel, a chassis relatively pivotable in and about said housing, frictional means supporting said chassis, the improvement comprising in combination, a rock cam supported by the base of said housing, a wire spring cooperatively coupled to said chassis and having a depending portion thereon operatively engaging said rock cam, said rock cam comprising congruous halves, a cam surface formed in each of said halves and extending substantially slightly less than the overall surface thereof, said cam surface being defined by an area extending interiorly inwardly from the overall surface of the rock cam half, a recess formed below the base depth of and contiguous to each such area of said cam surface, the recess in each half of said rock cam being adjacent to and in alignment with the area of said cam surface in the other half of said rock cam, each such recess constituting a positive-lock recess for said depending portion of said wire spring, thereby locking the chassis in a limit position, said housing and panel capable of pivoting about said chassis supported by said frictional means upon camming of said depending portion from one recess to the other.

2. In a prismoidal reflective mirror adapted for high and low intensity reflection and having a reflecting prism panel, a housing supporting said panel, a chassis about which said housing is pivotable, means frictionally supporting said chassis by which said chassis substantially remains stationary with respect thereto, the improvement comprising in combination, a rock cam mounted and centered upon the base of said housing, a wire spring having a depending portion thereon and cooperatively coupled to the chassis whereby said chassis moves in the same corresponding manner as said spring, said rock cam comprising congruous halves, a cam surface formed in each of said halves and extending substantially slightly less than the overall surface thereof, said cam surface being defined by an area extending interiorly inwardly from the overall surface of the rock cam half, a recess formed below the base depth of and contiguous to each such area of said cam surface, the recess in each half of said rock cam being adjacent to and in alignment with the area of said cam surface in the other half of said rock cam, each such recess constituting a positive-lock recess for said depending portion of said wire spring, said depending portion registering in one of said positive-lock recesses, whereby upon angular rotation of said rock cam, said wire spring is cammed from its one positive-lock recess in which said chassis is in one limit position, to the other positive-lock recess in the other half of said cam in which said chassis is in its other limit position, the intensity reflections of such a panel having been switched thereby through said housing pivoting about said chassis.

3. In a mechanism adapted for the titlting into one of two reflecting positions of a prismoidal reflective panel capable of reflecting high and low intensity reflections, comprising a housing for such a panel, a chassis, said housing pivotally supported on said chassis, means frictionally supporting said chassis by which said chassis substantially remains stationary with respect thereto, the improvement comprising in combination, a rock cam mounted in said housing, a wire spring cooperatively coupled to said chassis and having a depending portion said rock cam comprising congruous halves, a cam surface formed in each of said halves and extending substantially slightly less than the overall surface thereof, said cam surface being defined by an area extending interiorly inwardly from the overall surface of the rock cam half, a recess formed below the base depth of and contiguous to each such area of said cam surface, the recess in each half of said rock cam being adjacent to and in alignment with the area of said cam surface in the other half of said rock cam, each such recess constituting a positive-lock recess for said depending portion compressively interposed in a said recess, said rock cam angularly rotatable in said housing whereby said depending portion is cammed to the recess in the other half of said rock cam by means of the cam surface above such recess, said housing relatively pivoting about said chassis thereby changing the panel to the other of the two reflecting positions.

4. In a day and night rear view mirror in which normal or reduced intensity of the observed image may be alternatively and positively selected by the user, the combination comprising a chassis having an aperture and a seat annularly thereof, a ball-headed staff adapted to be secured to a vehicle with the ball thereof engageable with said chassis seat, means resiliently urging said ball into frictional engagement with said seat to secure said chassis relative to said ball, a case pivotally supported upon and housing said chassis, said chassis having stop members adapted to cooperate with said case to establish predetermined limits of pivoting movement of said case relative to said chassis, a mirror secured to said case, a resilient wire extension supported on said chassis, a rock cam, a cam box supporting said rock cam for pivoting about an axis fixed in relation to said case, said rock cam having first and second resilient extension receiving and holding recesses in respective halves of said rock cam, first and second cam surfaces disposed immediately above said first and second recesses respectively, each recess being adjacent a cam surface in the rock cam half not containing such recess, said extension being dislodgeable from one of said receiving and holding recesses into cooperative engagement with the adjacent cam surface intersected thereby only by rocking of said rock cam and cammed by said adjacent cam surface into a second receiving and holding recess to positive pivot said case and mirror through a predetermined angle and lock same in predetermined relation to said chassis even when said chassis is repositioned relative to said ball-head, said extension urging said rock cam to pivot about its axis into a predetermined position, corresponding to the particular recess in which the cooperating portion of said extension is disposed.

5. In a day and night rear view mirror in which normal or reduced intensity of the observed image may be alternatively and positively selected by the user, the combination comprising a chassis having an aperture and a seat annularly thereof, a ball-headed staff adapted to be secured to a vehicle with the ball thereof engageable with said chassis seat, means resiliently urging said ball into frictional engagement with said seat to secure said chassis relative to said ball, a case pivotally supported upon and housing said chassis, said chassis having stop members adapted to cooperate with said case to establish predetermined limits of movement of said case relative to said chassis, a prismoidal mirror secured to said case, a resilient wire stirrup form extension supported on said chassis, a rock cam, a cam box stabilizing said rock cam for pivoting about an axis fixed in relation to said case, said rock cam having first and second resilient extension receiving and holding grooves in respective halves thereof, first and second cam surfaces disposed immediately above said first and second recesses respectively, each groove being adjacent a cam surface in the rock cam half not containing such groove, said extension being ejectable from one of said receiving and holding recesses into cooperative engagement with the adjacent cam surface intersected thereby only by rocking of said rock cam and cammed by said adjacent cam surface into a second receiving and holding groove to positively pivot said case and mirror through a predetermined angle and lock same in predetermined relation to said chassis even when said chassis is repositioned to said ball-head, said extension urging said rock cam to pivot about its axis into a predetermined position corresponding to the particular groove in which the co-operating portion of said extension is disposed.

6. In an adjustable mirror, the combination comprising a chassis, means for supporting the chassis, a case pivotally supported upon said chassis, a mirror secured to said case, a cam stop resiliently supported on said chassis, said cam stop including a cam-engaging head extending parallel to the axis of pivoting of the case, a rock cam rotatably mounted on the case for swinging upon an axis extending transversely of the cam-engaging head, said cam having first and second cam-engaging head receiving and holding recesses in respective halves thereof and extending parallel to said cam-engaging head, said recesses being adjacent and spaced circumferentially of the axis of pivoting of the case, each of said recesses being adapted to receive and hold the cam-engaging head with the case in one of a pair of predetermined positions, a cam surface in each half of said rock cam aligned with a recess in the other half of said rock cam such recess terminating into said cam surface, said cam surface extending away from the axis of pivoting of the case and toward the recess in the cam half in which such cam surface is disposed, and means for swinging the cam between the first position in which the head is received in one of the recesses and a second position in which the head is received in the other recess, the head being resiliently urged away from the axis of pivoting, each of the cam surfaces being constructed and arranged to raise the head dislodgeable from the recess aligned therewith and to direct the head into the other recess upon swinging of the cam in a selected direction.

7. In a rear view mirror having a prismoidal reflective panel capable of reflecting high and low intensity reflections, a housing securely supporting said panel, a chassis, said housing pivotally supported on said chassis, frictional means supporting said chassis in a substantially stationary position, the improvement comprising in combination, a rock cam mounted in said housing, a resilient wire spring cooperatively coupled to said chassis and having a depending portion thereon engaging said rock cam, said rock cam comprising congruous halves, a cam surface formed in each of said halves and extending substantially slightly less than the overall surface thereof, said cam surface being defined by an area extending interiorly inwardly from the overall surface of the rock cam half, a recess formed below the base depth of and contiguous to each such area of said cam surface, the recess in each half of said rock cam being adjacent to and in alignment with the area of said cam surface in the other half of said rock cam, each such recess constituting a positive-lock recess for said depending portion of said wire spring, means mounted on said chassis engageable with the rear wall of the housing limiting forward pivotal movement of said housing relative to said chassis, stop means provided in the base of said housing, stop members on said chassis engageable with said stop means limiting rearward pivotal movement of said housing relative to said chassis, said mounted means, stop means, and stop members preventing relative over-extension movement of said chassis in either of its two limiting positions, the depending portion of said spring in either of the two positive-lock recesses providing for one of the two reflecting positions of the reflective panel without disturbing the aim of the panel.

References Cited by the Examiner

UNITED STATES PATENTS

| 2,669,159 | 2/1954 | Rogers | 88—77 |
| 2,964,999 | 12/1960 | Mazur | 88—77 |
| 2,993,410 | 7/1961 | Bertell et al. | 88—77 X |

JEWELL H. PEDERSEN, *Primary Examiner.*

FREDERICK M. STRADER, *Examiner.*

DAVID H. RUBIN, J. K. CORBIN, *Assistant Examiners.*